United States Patent
Yoon et al.

(10) Patent No.: US 10,917,185 B2
(45) Date of Patent: *Feb. 9, 2021

(54) METHOD AND APPARATUS FOR MEASURING SYNCHRONIZATION SIGNAL BLOCK

(71) Applicant: LG Electronics Inc., Soul (KR)

(72) Inventors: Sukhyon Yoon, Seoul (KR); Hyunsoo Ko, Seoul (KR); Kijun Kim, Seoul (KR); Youngsub Kim, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/064,869

(22) PCT Filed: Jun. 15, 2018

(86) PCT No.: PCT/KR2018/006748
§ 371 (c)(1),
(2) Date: Jun. 21, 2018

(87) PCT Pub. No.: WO2018/230984
PCT Pub. Date: Dec. 20, 2018

(65) Prior Publication Data
US 2020/0120622 A1   Apr. 16, 2020

Related U.S. Application Data

(60) Provisional application No. 62/521,265, filed on Jun. 16, 2017, provisional application No. 62/542,036, filed on Aug. 8, 2017.

(51) Int. Cl.
*H04W 56/00* (2009.01)
*H04W 24/10* (2009.01)
(Continued)

(52) U.S. Cl.
CPC ......... *H04B 17/318* (2015.01); *H04L 1/0026* (2013.01); *H04L 5/0051* (2013.01);
(Continued)

(58) Field of Classification Search
None
See application file for complete search history.

(56) References Cited

U.S. PATENT DOCUMENTS

2017/0064613 A1   3/2017 Harada et al.
2017/0086133 A1   3/2017 Song et al.
(Continued)

FOREIGN PATENT DOCUMENTS

KR   1020140095994   8/2014
KR   1020160010849   1/2016
(Continued)

OTHER PUBLICATIONS

Intel Corp., "Synchronization Signal Periodicity", Apr. 3-7, 2017, 3GPP TSG RAN WG1 Meeting RAN1 #88, pp. 1-4 (Year: 2017).*
(Continued)

*Primary Examiner* — Steve R Young
(74) *Attorney, Agent, or Firm* — Fish & Richardson P.C.

(57) ABSTRACT

The present invention discloses a method for measuring a Synchronization Signal Block (SSB) by a terminal in a wireless communication system. In particular, the method according to the present invention may include: receiving a cell list including information of at least one first cell, first SSB transmission periodicity information for the at least one cell, and second SSB transmission periodicity information for a second cell that is not included in the cell list; measuring Reference Signal Received Power (RSRP) for an SSB of the at least one first cell based on a first SSB measurement window, which is set up by using the first SSB transmission periodicity information; and measuring RSRP
(Continued)

for an SSB of the second cell based on a second SSB measurement window, which is set up by using the second SSB transmission periodicity information.

12 Claims, 10 Drawing Sheets

(51) Int. Cl.
| | | |
|---|---|---|
| *H04B 17/318* | (2015.01) | |
| *H04L 1/00* | (2006.01) | |
| *H04L 5/00* | (2006.01) | |
| *H04W 24/08* | (2009.01) | |

(52) U.S. Cl.
CPC ........... *H04W 24/08* (2013.01); *H04W 24/10* (2013.01); *H04W 56/001* (2013.01)

(56) References Cited

U.S. PATENT DOCUMENTS

| | | | |
|---|---|---|---|
| 2018/0109345 | A1 | 4/2018 | Svedman et al. |
| 2018/0279240 | A1* | 9/2018 | Sheng ................ H04B 1/7083 |
| 2018/0302819 | A1* | 10/2018 | Lee ...................... H04B 7/0626 |
| 2019/0268813 | A1* | 8/2019 | Ramachandra ....... H04W 76/27 |
| 2020/0037212 | A1 | 1/2020 | Ramachandra et al. |
| 2020/0092740 | A1* | 3/2020 | Yokomakura ......... H04W 72/04 |
| 2020/0145854 | A1* | 5/2020 | Harada ................. H04W 24/08 |

FOREIGN PATENT DOCUMENTS

| | | |
|---|---|---|
| KR | 1020160017640 | 2/2016 |
| KR | 1020160036674 | 4/2016 |
| KR | 101631038 | 6/2016 |
| KR | 10-2016-0128401 | 11/2016 |
| KR | 10-2017-0027736 | 3/2017 |
| KR | 1020170044218 | 4/2017 |
| WO | WO2016202386 | 12/2016 |
| WO | 2017/039397 | 3/2017 |
| WO | WO2018175984 | 9/2018 |

OTHER PUBLICATIONS

Ericsson, "Mobility measurements based on SS block", May 15-19, 2017, 3GPP TSG-RAN WG1 #89, pp. 1-3 (Year: 2017).*

Ericsson, "Cell re-selection measurement window", May 15-19, 2017, 3GPP TSG-RAN WG2 #92, pp. 1-4 (Year: 2017).*

Intel Corporation, "Synchronization Signal Default Periodicity," R1-1702179, 3GPP TSG RAN WG1 Meeting RAN1 #88, Athens, Greece, date Feb. 13-17, 2017, 3 pages.

Ericsson, "Mobility measurements based on SS block," R1-1714044, 3GPP TSG RAN WG1 Meeting #90, Prague, Czech Republic, dated Aug. 21-25, 2017, 3 pages.

United States Office Action in U.S. Appl. No. 16/535,805, dated Oct. 29, 2019, 19 pages.

Intel Corporation, "Synchronization Signal Periodicity," 'R1-1704710', 3GPP TSG RAN WG1 Meeting RAN1 #88, Spokane, WA, U.S.A. Apr. 3-7, 2017, 5 pages.

AT&T, "Measurement based on SS block," 'R1-1707757', 3GPP TSG RAN WG1 Meeting #89, Hangzhou, China May 15-19, 2017, 3 pages.

Ericsson, "Mobility measurements based on SS block," 'R1-1708727', 3GPP TSG-RAN WG1 #89, Hangzhou, China, May 15-19, 2017, 4 pages.

Office Action in Korean Application No. 10-2018-0068762, dated Nov. 29, 2018, 3 pages (with English Translation).

Ericsson, "Cell re-selection measurement window," R2-1705436, 3GPP TSG-RAN WG2 #98, Hangzhou, P.R. of China, dated May 15-19, 2017, 4 pages, XP051275832.

Extended European Search Report in European Application No. 18818654.8, dated Feb. 26, 2020, 13 pages.

LG Electronics, "SS block based RRM measurement," R1-1707595, 3GPP TSG RAN WG1 Meeting #89, Hangzhou, China, dated May 15-19, 2017, 3 pages, XP051272803.

Korean Notice of Allowance in Korean Application No. 10-2019-0017719, dated Jan. 2, 2020, 3 pages (with English translation).

Chinese Office Action in Chinese Application No. 201880017270.X, dated Jun. 3, 2020, 15 pages (with English translation).

CMCC, "Discussion on RRM measurement on SS blocks," R1-1710977, 3GPP TSG RAN WG1 Meeting NR Adhoc, Qingdao, China, dated Jun. 27-30, 2017, 5 pages.

Intel Corporation, "Signaling configuration for xSS," R2-1704769, 3GPP TSG RAN WG2 Meeting #98, Hangzhou, China, dated May 15-19, 2017, 4 pages.

Japanese Office Action in Japanese Application No. 2019-556782, dated Jun. 30, 2020, 4 pages (with English translation).

ZTE, "RRM measurements on IDLE mode RS," R1-1707050 3GPP TSG RAN WGI Meeting #89, Hangzhou, P.R. China, dated May 15-19, 2017, 8 pages.

United States Office Action in U.S. Appl. No. 16/535,805, dated Nov. 19, 2020, 32 pages.

* cited by examiner

FIG. 1
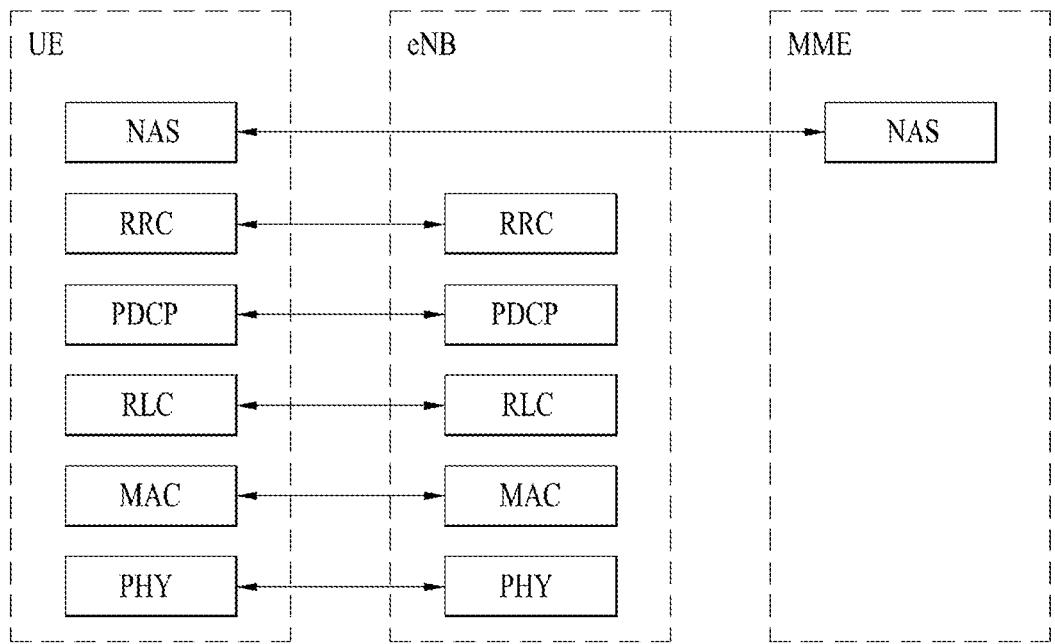
(A) CONTROL-PLANE PROTOCOL STACK
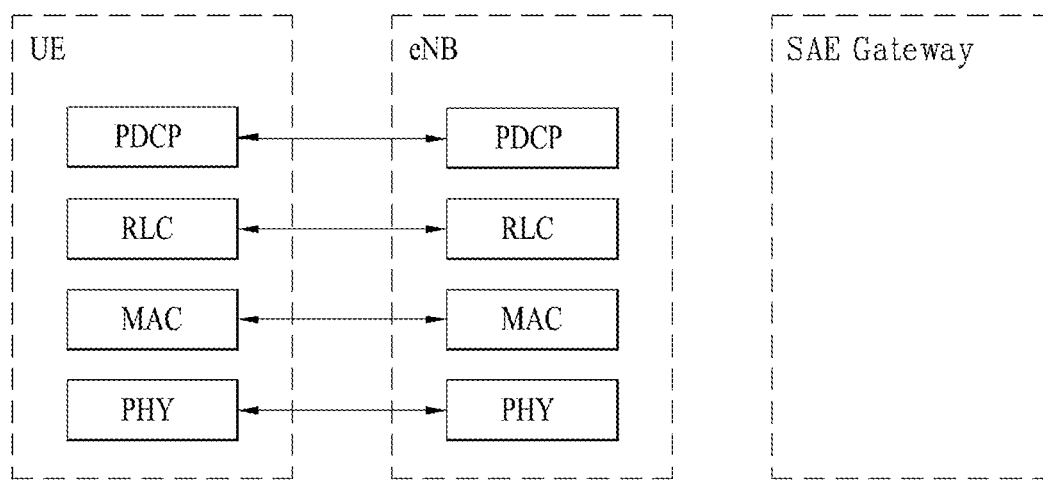
(B) USER-PLANE PROTOCOL STACK

METHOD AND APPARATUS FOR MEASURING SYNCHRONIZATION SIGNAL BLOCK

CROSS-REFERENCE TO RELATED APPLICATIONS

This application is a National Stage application under 35 U.S.C. § 371 of International Application No. PCT/KR2018/006748, filed on Jun. 15, 2018, which claims the benefit of U.S. Provisional Application No. 62/521,265, filed on Jun. 16, 2017, and U.S. Provisional Application No. 62/542,306, filed on Aug. 8, 2017. The disclosures of the prior applications are incorporated by reference in their entirety.

TECHNICAL FIELD

The present invention relates to a method for measuring a Synchronization Signal Block (SSB) and device therefor, and more particularly, to a method for configuring SSB measurement timing for each cell to measuring SSBs transmitted from a plurality of cells located in the vicinity of a User Equipment (UE) and device therefor.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE OF THE INVENTION

Technical Task

The object of the present invention is to provide a method for measuring a Synchronization Signal Block (SSB) and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an embodiment of the present invention, provided is a method for measuring a Synchronization Signal Block (SSB) by a User Equipment (UE) in a wireless communication system. The method may include: receiving a cell list including information of at least one first cell, first SSB transmission periodicity information for the at least one cell, and second SSB transmission periodicity information for a second cell that is not included in the cell list; measuring Reference Signal Received Power (RSRP) for an SSB of the at least one first cell based on a first SSB measurement window, which is set up by using the first SSB transmission periodicity information; and measuring RSRP for an SSB of the second cell based on a second SSB measurement window, which is set up by using the second SSB transmission periodicity information.

In this case, the first and second SSB measurement windows may be set up by further using information on an offset and measurement duration, which is received together with either or both of the first and second SSB transmission periodicity information.

In addition, the first and second SSB measurement windows may be set up by using information on the same offset and measurement duration.

Moreover, the SSB of the first and second cells may be composed of a Primary Synchronization Signal (PSS), a Secondary Synchronization Signal (SSS), and a Physical Broadcasting Channel (PBCH).

Further, the RSRP of the SSB of the first and second cells may be measured by using Resource Elements (REs) on which the SSS is transmitted and a Demodulation Reference Signal (DMRS) received in a region where the PBCH is received.

Additionally, if information on a Channel State Information-Reference Signal (CSI-RS) for RSRP measurement is further received, the RSRP of the SSB of the first and second cells may be measured by further using the CSI-RS.

Additionally, no RSRP may be measured in other time periods except the first and second measurement windows.

The present invention provides a User Equipment (UE) for measuring a Synchronization Signal Block (SSB) in a wireless communication system. The UE may include: a transceiver configured to transmit and receive signals; and a processor configured to control the transceiver. In this case, the processor may be configured to: control the transceiver to receive a cell list including information of at least one first cell, first SSB transmission periodicity information for the at least one cell, and second SSB transmission periodicity information for a second cell that is not included in the cell list; measure Reference Signal Received Power (RSRP) for an SSB of the at least one first cell based on a first SSB measurement window, which is set up by using the first SSB transmission periodicity information; and measure RSRP for an SSB transmitted from the second cell based on a second SSB measurement window, which is set up by using the second SSB transmission periodicity information.

In this case, the first and second SSB measurement windows may be set up by further using information on an offset and measurement duration, which is received together with either or both of the first and second SSB transmission periodicity information.

In addition, the first and second SSB measurement windows may be set up by using information on the same offset and measurement duration.

Moreover, the SSB of the first and second cells may be composed of a Primary Synchronization Signal (PSS), a Secondary Synchronization Signal (SSS), and a Physical Broadcasting Channel (PBCH), and the RSRP of the SSB of the first and second cells may be measured by using Resource Elements (REs) on which the SSS is transmitted and a Demodulation Reference Signal (DMRS) received in a region where the PBCH is received.

Further, if information on a Channel State Information-Reference Signal (CSI-RS) for RSRP measurement is further received, the RSRP of the SSB of the first and second cells may be measured by further using the CSI-RS.

Additionally, no RSRP may be measured in other time periods except the first and second measurement windows.

Advantageous Effects

According to the present invention, when a network supports multiple SSB transmission periodicity, SSB transmission periodicity can be configured per cell, whereby an SSB can be efficiently measured based on the relationship between a UE and each cell.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

DESCRIPTION OF DRAWINGS

FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

BEST MODE FOR INVENTION

Figure 2:
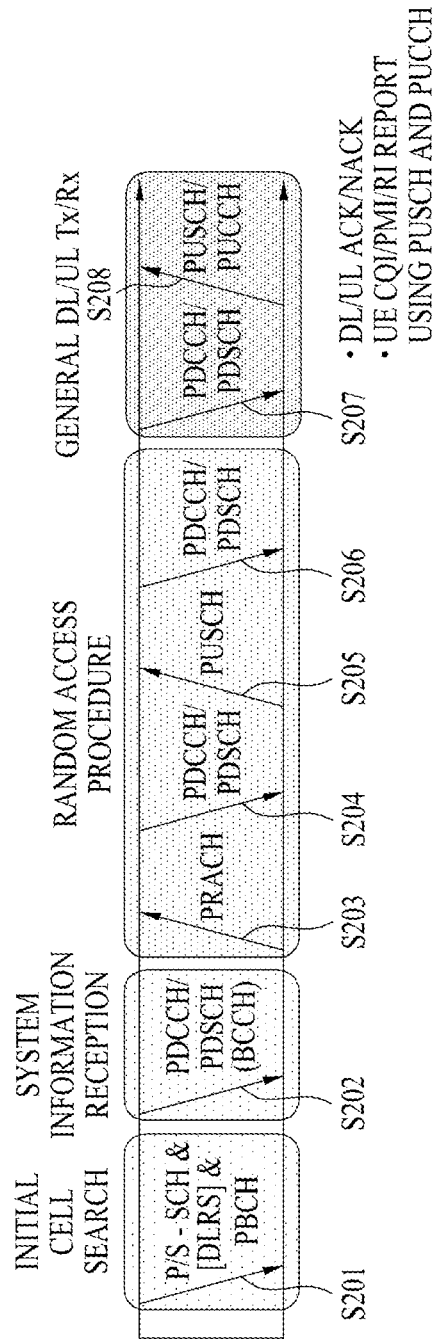
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
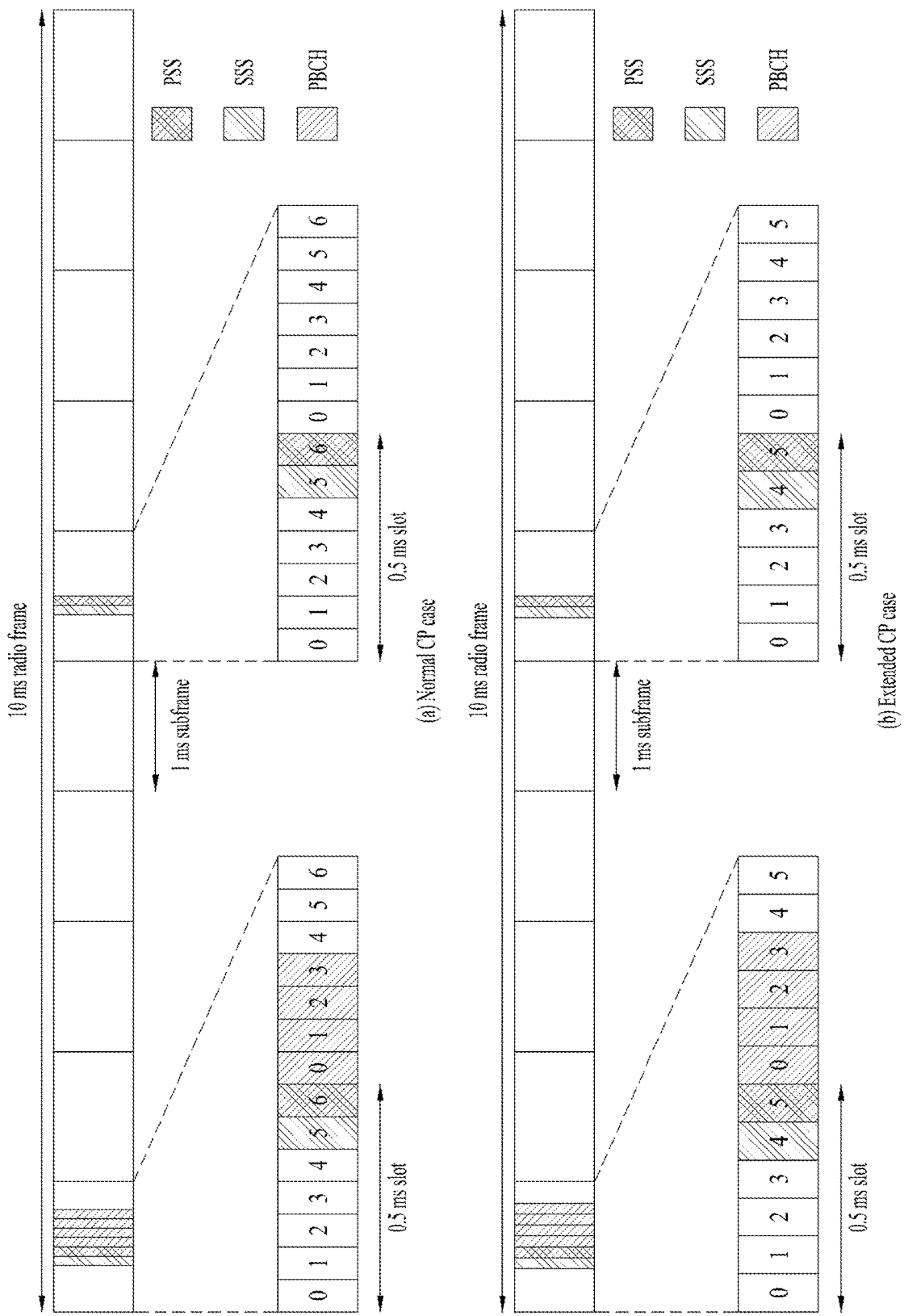
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

Figure 4:
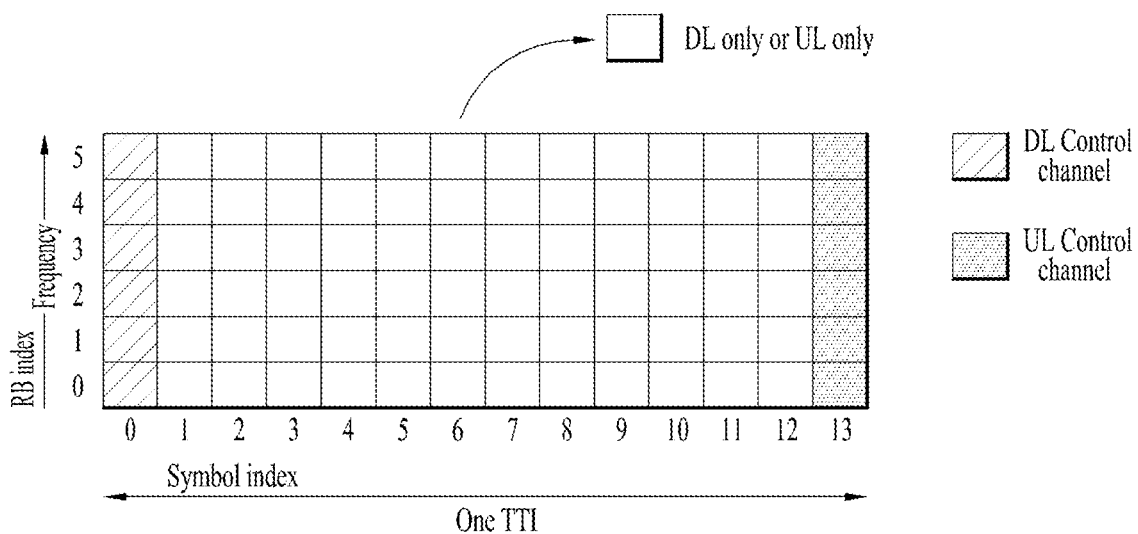
FIG. 4 is a view illustrating an exemplary slot structure available in new radio access technology (NR).

An SS will be described in more detail with reference to FIG. 3. An SS is categorized into a primary synchronization signal (PSS) and a secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

<Radio Resource Management (RRM) Measurement in LTE>

The LTE system supports RRM operation including power control, scheduling, cell search, cell reselection, handover, radio link or connection monitoring, and connection establishment and re-establishment. In this case, a serving cell may request a UE to send RRM measurement information corresponding to a measurement value for performing the RRM operation. In particular, in the LTE system, the UE may measure cell search information, Reference Signal Received Power (RSRP), Reference Signal Received Quality (RSRQ), and the like for each cell and then report the measured information. Specifically, in the LTE system, the UE receives 'measConfig' for RRM measurement from a serving cell through a higher layer signal and then measure RSRP or RSRQ according to information in 'measConfig'. The RSRP and RSRQ are defined as follows in TS 36.214.

RSRP: RSRP is defined as the linear average over the power contributions ([W]) of the Resource Elements (REs) of Cell-specific Reference Signals (CRSs) transmitted in the measurement frequency bandwidth. For RSRP determination, CRS R0 according TS 36.211 may be used. In some cases, CRS R1 may be additionally used to improve reliability. The reference point for the RSRP should be an antenna connector of a UE. If receiver diversity is in use, a reported RSRP value shall not be lower than RSRP of anyone of individual diversities.

RSRQ: RSRQ is defined as N*RSRP/(E-UTRA carrier RSSI), where N is the number of RBs in E-UTRA carrier RSSI measurement bandwidth. In this case, the measurement of 'N*RSRP' and 'E-UTRA carrier RSSI' may be made over the same RB set.

E-UTRA Carrier RSSI is defined as the linear average of the total received power measured only in OFDM symbols containing reference symbols for antenna port 0 on N RBs obtained from all sources including co-channel serving and non-serving cells, adjacent channel interference, thermal noise etc.

If higher layer signaling indicates specific subframes for performing RSRP measurement, RSSI is measured over all indicated OFDM symbols. The reference point for the RSRQ should be an antenna connector of a UE. If receiver diversity is in use, a reported RSRQ value shall not be lower than RSRQ of anyone of individual diversities.

RSSI: RSSI means received wide band power including noise and thermal noise generated within bandwidth defined by a receiver pulse shaping filter. Even in this case, the reference point for the RSSI should be an antenna connector of a UE. If receiver diversity is in use, a reported RSSI value shall not be lower than RSSI of anyone of individual diversities Based on the definitions, in the case of intra-frequency measurement, a UE operating in the LTE system is allowed to measure RSRP in bandwidth corresponding to one of 6, 15, 25, 50, 75, 100 RBs by the allowed measurement bandwidth related Information Element (IE) transmitted in System Information Block type 3 (SIB3). Meanwhile, in the case of inter-frequency measurement, the UE is allowed to measure RSRP in bandwidth corresponding to one of 6, 15, 25, 50, 75, 100 RBs by the allowed measurement bandwidth related IE transmitted in SIBS. Alternatively, when there is no IE, the UE may measure RSRP in the entire downlink system frequency band as the default operation. Upon receiving information on the allowed measurement bandwidth, the UE may consider the corresponding value as the maximum measurement bandwidth and then freely measure the RSRP value within the corresponding value.

However, if the serving cell transmits the IE defined as WB-RSRQ and sets the allowed measurement bandwidth equal to or more than 50 RBs, the UE should calculate the RSRP value for the entire allowed measurement bandwidth. Meanwhile, in the case of RSSI, the UE measures RSSI within the frequency band of the UE's receiver according to the definition of RSSI bandwidth.

The NR communication system should provide much better performance than the conventional 4G system in terms of data rates, capacity, latency, energy consumption, and costs. In other words, it is necessary to further improve the bandwidth, spectral energy, signaling efficiency, and cost-per-bit of the NR system <OFDM Numerology>

A New RAT system adopts an OFDM transmission scheme or a transmission scheme similar to the OFDM transmission scheme. The New RAT system may use different OFDM parameters from LTE OFDM parameters. Or the New RAT system may follow the numerology of legacy LTE/LTE-A but have a larger system bandwidth (e.g., 100 MHz). Or one cell may support a plurality of numerologies. That is, UEs operating with different numerologies may co-exist within one cell.

<Subframe Structure>

In the 3GPP LTE/LTE-A system, a radio frame is 10 ms(307200 $T_s$) long, including 10 equal-size subframes (SFs). The 10 SFs of one radio frame may be assigned numbers. $T_s$ represents a sampling time and is expressed as $T_s=1/(2048*15 \text{ kHz})$. Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

FIG. 4 illustrates an exemplary slot structure available in the new radio access technology (NR).

To minimize a data transmission delay, a slot structure in which a control channel and a data channel are multiplexed in time division multiplexing (TDM) is considered in $5^{th}$ generation (5G) NR.

In FIG. 4, an area marked with slanted lines represents a transmission region of a DL control channel (e.g., PDCCH) carrying DCI, and a black part represents a transmission region of a UL control channel (e.g., PUCCH) carrying UCI. DCI is control information that a gNB transmits to a UE, and may include information about a cell configuration that a UE should know, DL-specific information such as DL scheduling, and UL-specific information such as a UL grant. Further, UCI is control information that a UE transmits to a gNB. The UCI may include an HARQ ACK/NACK report for DL data, a CSI report for a DL channel state, a scheduling request (SR), and so on.

In FIG. 4, symbols with symbol index 1 to symbol index 12 may be used for transmission of a physical channel (e.g., PDSCH) carrying DL data, and also for transmission of a physical channel (e.g., PUSCH) carrying UL data. According to the slot structure illustrated in FIG. 2, as DL transmission and UL transmission take place sequentially in one slot, transmission/reception of DL data and reception/transmission of a UL ACK/NACK for the DL data may be performed in the one slot. As a consequence, when an error is generated during data transmission, a time taken for a data retransmission may be reduced, thereby minimizing the delay of a final data transmission.

In this slot structure, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the legacy LTE/LTE-A system, a DL control channel is multiplexed with a data channel in TDM, and a control channel, PDCCH is transmitted distributed across a total system band. In NR, however, it is expected that the bandwidth of one system will be at least about 100 MHz, which makes it inviable to transmit a control channel across a total band. If a UE monitors the total band to receive a DL control channel, for data transmission/reception, this may increase the battery consumption of the UE and decrease efficiency. Therefore, a DL control channel may be transmitted localized or distributed in some frequency band within a system band, that is, a channel band in the present disclosure.

In the NR system, a basic transmission unit is a slot. A slot duration includes 14 symbols each having a normal cyclic prefix (CP), or 12 symbols each having an extended CP. Further, a slot is scaled in time by a function of a used subcarrier spacing. That is, as the subcarrier spacing increases, the length of a slot decreases. For example, given 14 symbols per slot, if the number of slots in a 10-ms frame is 10 for a subcarrier spacing of 15 kHz, the number of slots is 20 for a subcarrier spacing of 30 kHz, and 40 for a subcarrier spacing of 60 kHz. As the subcarrier spacing increases, the length of an OFDM symbol decreases. The number of OFDM symbols per slot is different depending on the normal CP or the extended CP, and does not change according to a subcarrier spacing. The basic time unit for LTE, $T_s$ is defined as $1/(15000*2048)$ seconds, in consideration of the basic 15-kHz subcarrier spacing and a maximum FFT size of 2048. $T_s$ is also a sampling time for the 15-kHz subcarrier spacing. In the NR system, many other subcarrier spacings than 15 kHz are available, and since a subcarrier spacing is inversely proportional to a corresponding time length, an actual sampling time $T_s$ corresponding to subcarrier spacings larger than 15 kHz becomes shorter than $1/(15000*2048)$ seconds. For example, the actual sampling time for the subcarrier spacings of 30 kHz, 60 kHz, and 120 kHz may be $1/(2*15000*2048)$ seconds, $1/(4*15000*2048)$ seconds, and $1/(8*15000*2048)$ seconds, respectively.

<Analog Beamforming>

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 5:
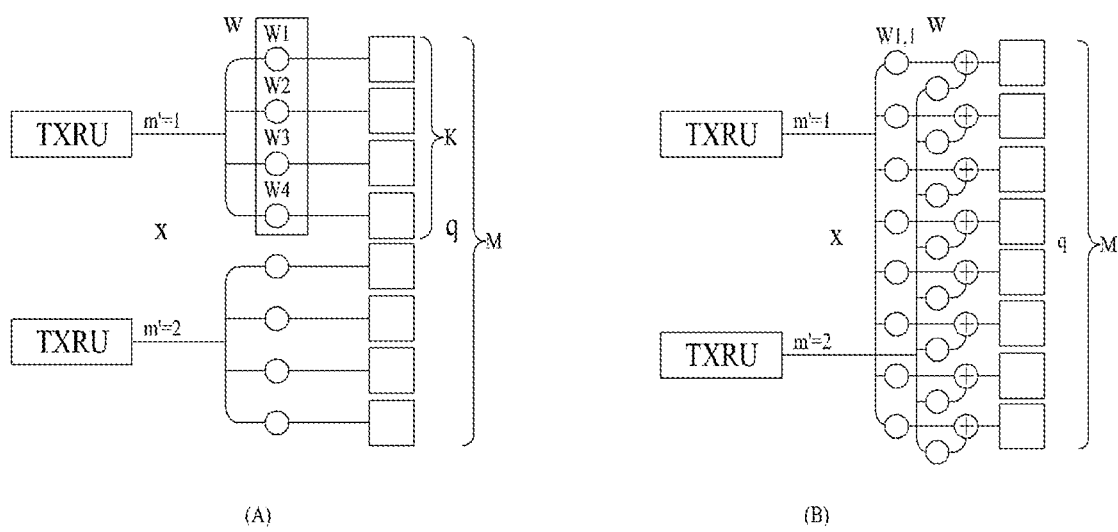
FIG. 5 is a view illustrating exemplary connection schemes between transceiver units (TXRUs) and antenna elements.

FIG. 5 is a view illustrating exemplary connection schemes between TXRUs and antenna elements.

(a) of FIG. 5 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present invention is proposed by reflecting limitations caused by the nature of analog BF or hybrid BF.

<Hybrid Analog Beamforming>

Figure 6:
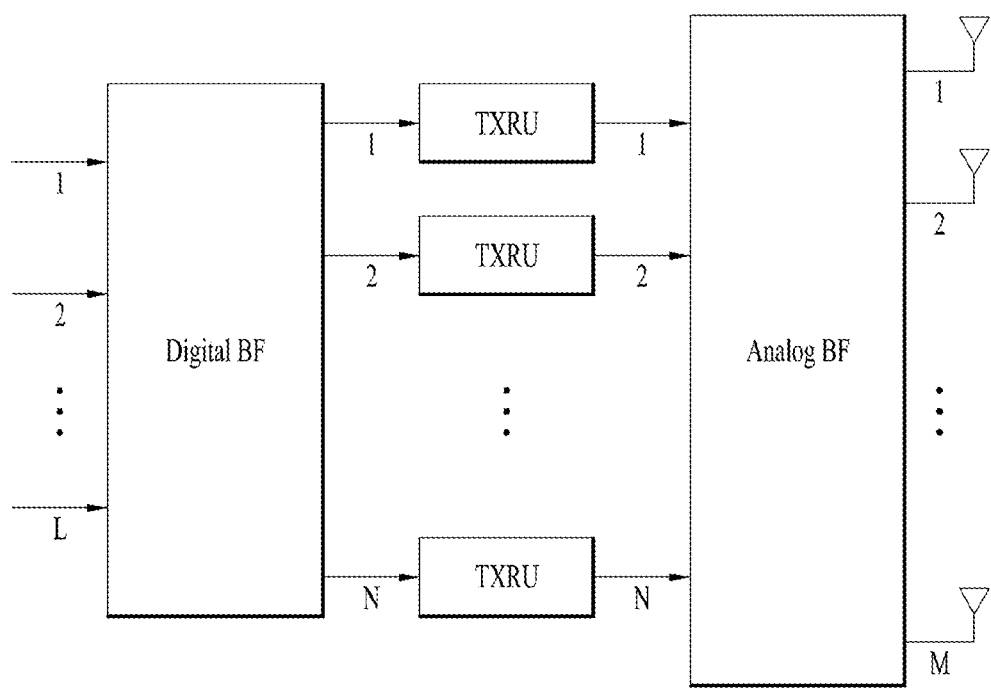
FIG. 6 is a view abstractly illustrating a hybrid beamforming structure in terms of TXRUs and physical antennas.

FIG. 6 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
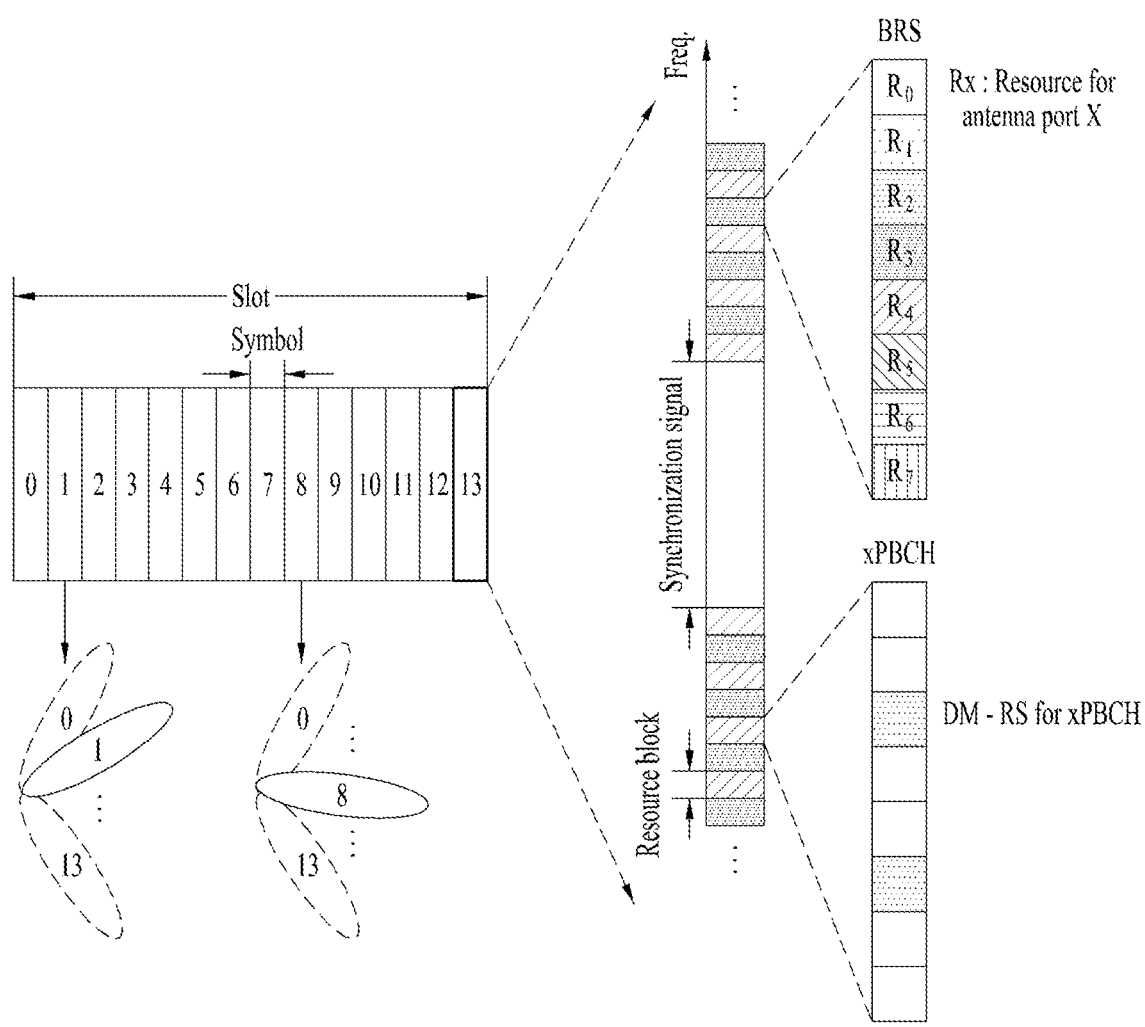
FIG. 7 is a view illustrating beam sweeping for a synchronization signal and system information during downlink (DL) transmission.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
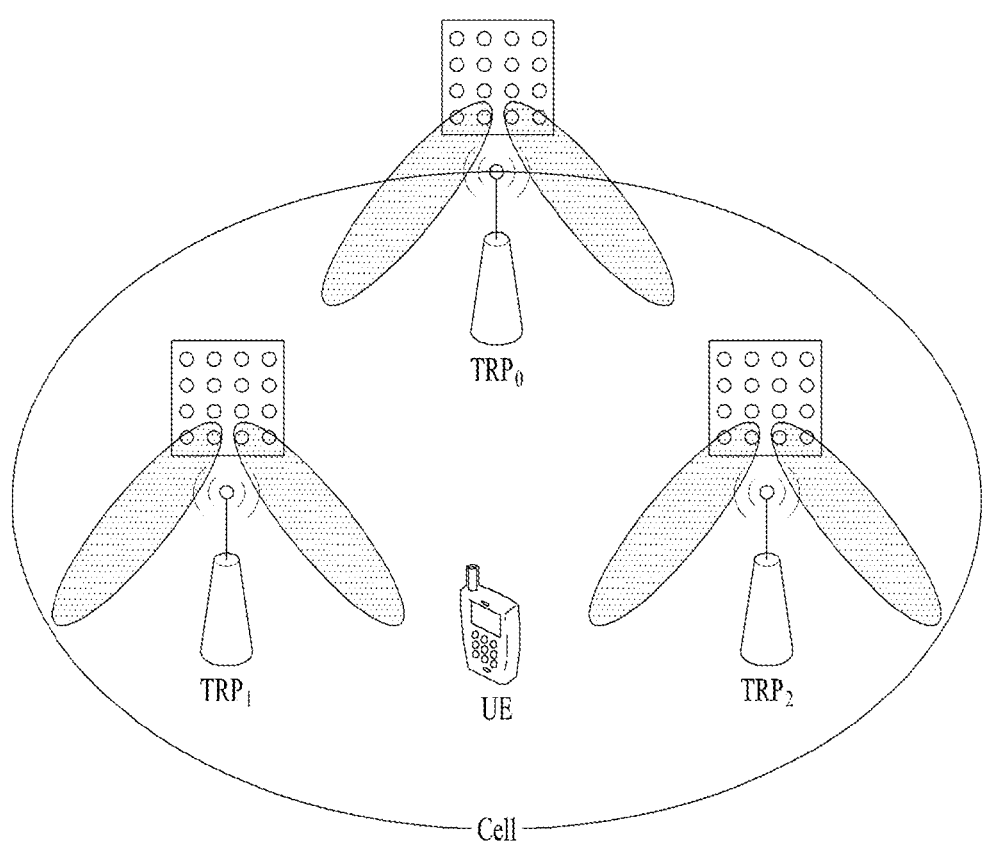
FIG. 8 is a view illustrating an exemplary cell in an NR system.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Meanwhile, in the NR system, no Common Reference Signal (CRS) is defined unlike the LTE system. Thus, the NR system performs neighbor cell measurement by using Synchronization Signal Blocks (SSBs), each of which is composed of PSS/SSS/PBCH, in addition to Channel State Information-Reference Signals (CSI-RSs) instead of CRSs. In addition, in the LTE system, a synchronization signal is transmitted at a predetermined period, whereas, in the NR system, various SSB transmission periodicity can be configured to support various operation methods for a BS.

Moreover, a UE checks whether there is a cell by using an SSB and obtains SSB reception timing. Based on the obtained information, the UE measures the RSRP of the SSB at a predetermined time. However, if the UE does not know SSB transmission periodicity, the UE should anticipate the SSB transmission periodicity after measuring the RSRP for all possible SSB transmission periodicity and also select RSRP to be used as the measurement value from the measured RSRP. This may cause a problem of increasing UE power consumption.

Therefore, SSB transmission periodicity should be provided to a UE. By doing so, upon receiving an SSB, the UE detects a cell and obtains timing information of the corresponding cell. Based on the timing information of the corresponding cell and the SSB transmission periodicity, the UE can measure RSRP only at the time when the SSB is transmitted, thereby reducing UE power consumption.

Hence, a measurement-related parameter should include SBS transmission periodicity. That is, neighbor cell RSRP measurement for supporting UE mobility in the NR system cannot start at a random time, which is determined by a UE. Instead, a parameter for neighbor cell measurement should be received from a BS in a call configuration step, and the parameter for the neighbor cell measurement may include an SSB configuration related parameter such as SSB transmission periodicity.

<Multiple SSBs in Wideband Component Carrier>

1. The Number of SSBs in a Wideband Component Carrier

For initial access and mobility support, at least one SSB should be allocated to a component carrier, and the SSB should be located at the preferred frequency location defined by channel raster. If the system bandwidth is greater than UE minimum bandwidth, a plurality of SSBs can be allocated to a wideband CC. In this case, if only one SSB is located within the UE minimum bandwidth, there is no problem in supporting the initial access. In other words, more than one SSB may not need to be located within the UE minimum bandwidth. Therefore, the maximum number of SSBs that can be transmitted within a component carrier is defined as [system bandwidth/UE minimum bandwidth defined in the frequency band]. However, even in this case, only the maximum number of SSBs that can be allocated within a component carrier is defined, but the number of actually allocated SSBs can be freely configured by a gNodeB.

Meanwhile, even though a plurality of SSBs are transmitted in a component carrier, the plurality of SSBs do not need to be broadcasted to UEs, and the frequency locations of the SSBs in a bandwidth part (BWP) may be UE-specifically signaled while a connection is configured or reconfigured.

2. RRM Measurement Using a Plurality of SSBs in a Wideband Component Carrier

When at least one BWP in one component carrier is allocated to a UE, at least one BWP containing an SSB should be allocated to support the mobility of the UE even if the frequency or measurement gap is changed by frequency retuning or measurement gap configuration.

As mentioned above, a network provides a wide bandwidth, but the network may transmit multiple SSBs in a wideband CC in order to support a UE capable of using a small bandwidth only, that is, with no capability of using the provided wide bandwidth. In this case, a UE with wide bandwidth capability can detect a plurality of SSBs and measure RSRP using all of the detected SSBs. However, the UE can performs handover from a source cell to a target cell in cell level and measure RSRP sufficiently by using only single SSB among the plurality of SSBs, and it is more efficient in terms of power consumption and UE complexity.

If the bandwidth of neighbor cells is smaller than that of a serving cell and each neighbor cell is located at different frequency, a UE may need to measure the RSRP of all SSBs at different frequencies. However, even if the locations of a plurality of SSBs for RRM measurement is configured by the network, the measurement capability of the UE should be defined per component carrier, and the UE may measure RSRP the same number of times per neighboring cell 3. A Method for Informing a UE of the Presence of an SSB Parameter and an SSB During initial access, a UE should search a cell to camp on and obtain information of an SSB to support mobility operation which could be applied to all the cells in the carrier frequency. In this case, the information of the SSB may include the periodicity of the SSB, the number of Actual Transmitted Synchronization Signal Blocks (ATSSs), or the time location of the SSB. The information of the SSB should be broadcasted on a PBCH or an RMSI in order to allow a UE in IDLE mode to measure RSRP for cell selection/reselection. In addition, the frequency location where the SSB is transmitted is signaled to a UE that enters IDLE mode after completion of call release.

When a UE enters CONNECTED mode and the BWP within a component carrier is configured, the gNodeB can provide the UE with the information of the SSB for the serving cell including the presence of the SSB, the periodicity of the SSB, ATSS information, etc. through a connection configuration message. In addition, if mobility is supported in the configured BWP, the information of the SSB for neighbor cells can be included in the connection configuration message.

Meanwhile, even if the number of SSBs (ATSSs) transmitted in a wideband component carrier can be freely configured by the gNodeB as described above, it may be beneficial to minimize the number of ATSSs if it does not affect the initial access performance. Therefore, some SSBs can be used only for intra-frequency mobility measurement without transmission of system information in specific frequency bands in order to reduce unnecessary system overhead. In this case, the network should inform a UE performing initial access that that system information is not transmitted on a PBCH. In other words, to reduce the system overhead, the network transmits only an SSB in specific frequency bands without transmission of Remaining Minimum System Information (RMSI) via PBCH contents, and in this case, the network should inform a UE that there is no RMSI transmission. Herein, RMSI can be referred to as System Information Block 1 (SIB 1).

However, besides that the network informs a UE that no system information is transmitted, it is necessary to consider whether there is a better method for allowing a UE to avoid unnecessary operation. To this end, an SSB with RMSI may be set different from an SSB with no RMSI or different PSS/SSS sequences may be respectively applied thereto, but as the simplest method, the SSB only for RRM measurement can be located at the frequency where initial access is not performed.

<Downlink Reference Signal for RRM Measurement>

1. Use of an SSS and a PBCH-DMRS for Downlink Measurement in IDLE Mode

Figure 9:
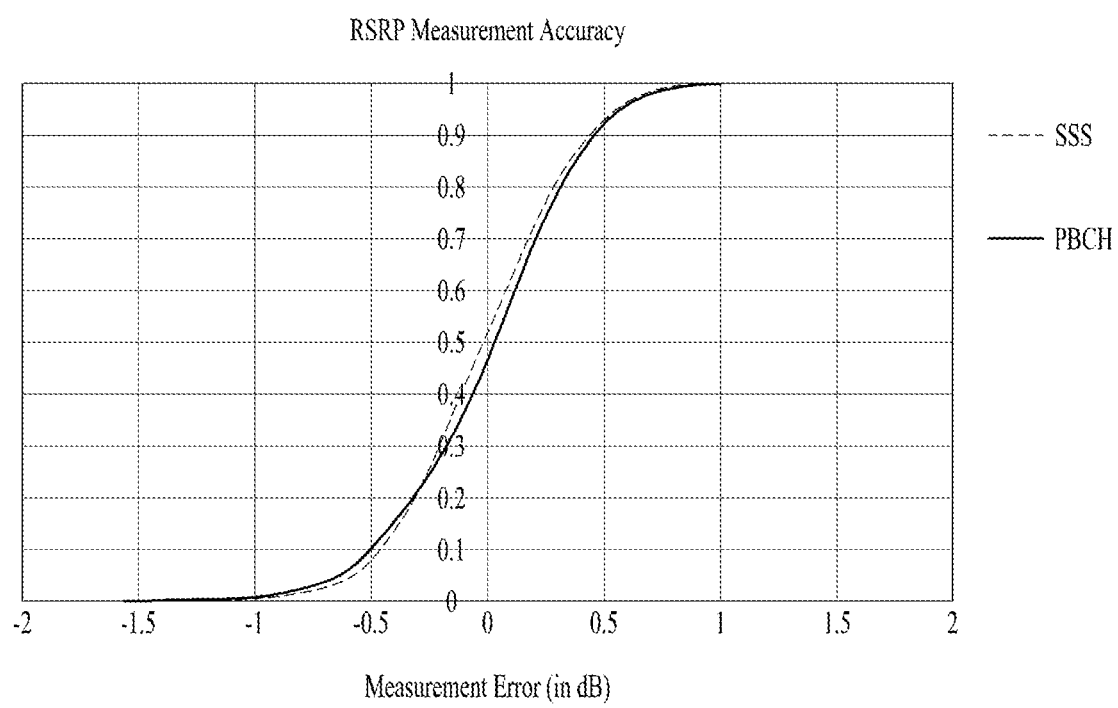
FIG. 9 shows the results of measuring Reference Signal Received Power (RSRP) based on a Secondary Synchronization Signal (SSS) and a Physical Broadcast Channel-Demodulation Reference Signal (PBCH-DMRS) according to an embodiment of the present invention.

In IDLE mode, an SSS is used for DL based RRM measurement, but it is still discussed whether a PBCH DM-RS can be additionally used for RRM measurement. FIG. 9 shows the RSRP accuracy based on an SSS of 2.16 MHz and a PBCH of 4.32 MHz with a subcarrier spacing of 15 kHz. As shown in FIG. 9, the SSS of 2.16 MHz provides proper RSRP accuracy for RRM measurement.

Meanwhile, since the network can boost the transmission power of an SSS for cell coverage, a UE should know the power offset of a PBCH DM-RS for the SSS in order to use the PBCH DM-RS for RRM measurement. However, since details on the power offset such as whether power boosting is applied to the SSS, how much power is allocated to the SSS depend on a cell environment and vary by cells, a PBCH DM-RS can be used for RRM measurement only when one power offset value can be applied to all cells at the same frequency. Otherwise, performance requirements should be determined on the premise of SSS-based measurement.

However, for better RRM measurement optimization, the power offset of the PBCH DM-RS can be set as the default value that is configured according to frequency bands for CONNECTED mode or configured per cell through the cell list in the measurement configuration. For example, the power offset of the PBCH DM-RS can be applied to each cell included in the cell list, and the default value configured according to the frequency bands may be applied to other cells which are not included in the cell list.

2. Neighbor Cell Measurement for Inter-Cell/Beam Interference Coordination (ICIC)

Meanwhile, neighbor cell measurement in CONNECTED mode is performed for inter-cell interference coordination. That is, a UE may perform neighbor cell measurement to report to a BS (gNodeB) that a specific cell or beam causes interference by measuring interference per cell or beam. The UE can estimate the interference level per cell based on the interference measurement per beam. In this case, whether beam-level cell interference measurement should be performed based on SSB-RSRP per cell in CONNECTED mode or based on CSI-RS-RSRP for beam-level interference measurement.

<Derivation of Cell Quality Based on RSRP Value Per Beam>

In order to support cell selection/reselection at a UE, it should be defined how to derive cell quality. Since there is no single RSRP value representing cell quality in a multi-beam environment, a UE should derive the cell quality based on a specific criteria. Of course, in a cell where a single SSB is transmitted, SSB-RSRP may represent the cell quality. On the other hand, for a cell where multiple SSBs are transmitted, a UE should use the RSRP of the multiple SSBs to obtain the cell quality. Similarly, when there are multiple CSI-RSs, if CSI-RSs are configured to support UE mobility, the UE should derive the cell quality using multiple CSI-RS RSRP in CONNECTED mode.

Therefore, the present invention proposes a method for deriving cell quality based on an RSRP value per beam. To derive cell quality, the time average of downlink reference signals with the best reception value at each measurement instance can be calculated according to [Equation 1] below. Here, the average does not mean averaging over such a spatial domain as multiple SSBs or multiple CSI-RSs at a given instance. A UE selects the best SSB-RSRP or CSI-RS RSRP at each measurement instance and calculates the average of the best SSB-RSRP or CSI-RS RSRP values during an averaging time window. In other words, it is proposed that the value in accordance with the best envelope of multiple SSB-RSRP or CSI-RS RSRP is determined as the cell quality such that a UE can determine the best serving cell.

$$P_{avg} = \frac{1}{T}\sum_{t} \max_{i} P_i(t) \quad \text{[Equation 1]}$$

(In Equation 1, $P_{avg}$ is a cell quality value, $P_i(t)$ is SSB-RSRP or CSI-RS RSRP, and T is an averaging window for the measurement.)

<Multiple Transmission Periodicity for SSB, Measurement Window, and Measurement Opportunity>

Hereinafter, it will be described whether multiple transmission periodicity can be configured for an SSB in a carrier, and the necessity thereof will be also described.

First, it may be considered that the SSB transmission periodicity of a service cell is different from that of a neighbor cell. In other words, even if sparse transmission of an SSB is applied due to the low mobility environment and for efficient use of resources, the SSB of the serving cell can be used for various purposes such as time and frequency tracking, radio link monitoring, beam management, and beam recovery, etc. In addition, the SSB transmission periodicity of the serving cell should be kept low regardless of that of the neighbor cell. By doing so, a UE can operate more stably in the cell.

Second, in the HetNet environment with the same carrier, a macro cell may transmit an SSB with a short periodicity focusing on mobility, and a small cell may transmit an SSB with a long periodicity focusing on high system throughput.

In this case, multiple SSB transmission periodicity can be considered in two aspects: cell detection and mobility measurement. First, regarding the cell detection, a UE may attempt to accumulate PSS or SSS correlation metrics for mobility performance improvement regardless of one-shot detection of SSSs. However, in this case, it may be difficult to configure multiple SSB transmission periodicity due to high UE complexity, and performance difference between single and multiple SSB transmission periodicity may be observed.

Next, RRM measurement operation will be described. In general, a UE measures the RSRP of the reference signal for a detected cell, and the RSRP value is filtered in L1 and/or L3. During the filtering operation, some cells may have very low RSRP values or could not be measured due to very low quality. In this case, the UE should determine whether to continue the measurement for the corresponding cells.

However, when multiple SSB transmission periodicity are configured, the UE may provide inaccurate measurement results or attempt to blindly detect the SSB transmission periodicity of each cell in spite of high complexity due to the multiple SSB transmission periodicity. To solve this issue, the network could provide the SSB transmission periodicity per cell in the cell list of the measurement configuration. In addition, the default SSB transmission periodicity in accordance with frequency may be provided by the network for cells that are not included in the cell list. That is, in the NR system, multiple SSB transmission periodicity can be configured in order to reduce UE complexity.

Hereinafter, the above embodiments will be described in more detail. In a single frequency band, BSs can be arranged in various forms, and various systems can be configured for each BS. For example, for system optimization, a BS having UEs connected thereto may use a different configuration from that of a BS having no connected UEs.

Specifically, the BS having connected UEs may allow the UEs to stably operate by increasing the transmission rate of Synchronization Signal Blocks (SSBs), whereas the BS having no connected UEs may decrease the SSB transmission rate or transmit no SSB in order to reduce its power consumption.

In addition, a case where a BS supporting high movement speed for UEs and a BS supporting low movement speed for UEs coexist in a single frequency band may be considered. Specifically, when high movement speed is supported, system frequency efficiency can be maximized by decreasing SSB transmission periodicity. On the contrary, when low movement speed is supported, the system frequency efficiency can be maximized by increasing the SSB transmission periodicity.

By supporting multiple SSB transmission periodicity as described above, a BS can not only obtain diversity for cell operation but also increase its frequency efficiency or reduce its power consumption according to the need. However, from the perspective of a UE, when the UE accesses the system supporting multiple SSB periodicity, the UE should perform the following operation if there is no related information.

First, during a cell search procedure, the UE obtains information on the time at which a transmitted signal is received from a PSS, calculates the time at which SSS reception is anticipated by using the time information, and then checks whether there is a cell from the correlation value of an SSS sequence at the anticipated time.

Thereafter, the UE measure RSRP by using the SSS or PBCH of a corresponding SSB according to the SSB transmission periodicity for the detected cell. However, when multiple SSB transmission periodicity is configured, the UE measures the RSRP value with reference to any one of the multiple SSB transmission periodicity.

However, if the UE measures RSRP by assuming short SSB transmission periodicity for all cells, the UE should autonomously determine the reason why the measured RSRP values are extremely low or there is no detected signal is either that communication quality is poor or that the actual SSB transmission periodicity is long. On the other hand, if the UE measures RSRP by assuming long SSR transmission periodicity for all cells, in the case of a cell of which the RSRP is detected to be very low or where there is no detected signal, the UE should determine that the corresponding cell has very poor communication quality.

In addition, when RSRP is measured on the premise of short SSB transmission periodicity, high receiver complexity may be required to determine the cause of RSRP quality degradation because blind detection is performed for the actual SSB transmission periodicity of a cell, the reliability of the SSB signal detection may be degraded, or the amount of power consumption may increase because the RSRP of all cells is measured with the short SSB transmission periodicity. On the contrary, when RSRP is measured on the premise of long SSB transmission periodicity, since the RSRP of a cell having short SSB transmission periodicity is measured by assuming the long SSB transmission periodicity, the mobility performance of the system may be degraded. In other words, in the case of a system supporting multiple SSB transmission periodicity, even if the system informs a UE connected to the system of the SSB transmission periodicity configured by the corresponding system, the UE cannot reduce its power consumption or its receiver complexity significantly increases.

Therefore, the present invention proposes a method for designating SSB transmission periodicity per cell for a system supporting multiple SSB transmission periodicity.

Specifically, a BS provides a UE with a list of major cells adjacent to the target cell through system information during the cell selection/re-selection step in initial access or IDLE mode. Alternatively, the BS provides the UE with the list of the major cells adjacent to the target cell via a measurement configuration message in the call configuration step.

When providing the cell list, the BS may transmit information on SSB transmission periodicity per cell together. After detecting a cell, the UE measures RSRP only at the time when the SSB of the corresponding cell is transmitted by using the SSB transmission periodicity per cell when measuring the RSRP of each cell. Thereafter, after filtering the measured RSRP information or reporting the measured RSRP information to higher layers, the UE may perform RRM measurement. By doing so, it is possible to not only avoid unnecessary power consumption at the UE but also reduce UE complexity.

However, when the cell list transmitted by the BS includes all the neighbor cells, the size of the cell list message significantly increases. In addition, during the cell operation step, the UE may unintentionally detect the SSB signal of a cell that is not included in the cell list, that is, a cell that does not exist in the vicinity of the target cell and then measure and determine that the SSB signal has the best reception quality.

That is, some of the cells detected by the UE may not be included in the cell list transmitted from the BS, and if there are a lot of such cells, the aforementioned problems may occur again. Since the cell list cannot be always perfect, to this end, it is proposed to define the default SSB transmission periodicity to be applied to cells which are not included in the cell list. The longest or shortest SSB transmission periodicity of SSB transmission periodicity allocated to individual cells may be determined as the default SSB transmission periodicity, and it can be defined in the relevant specification.

When the longest SSB transmission periodicity is determined as the default SSB transmission periodicity, RSRP is stably measured, and thus the ping-pong phenomenon where high and low RSRP values are repeatedly measured may not occur. However, if the detected cell supports high movement speed, the performance for high mobility may be degraded. On the contrary, when the shortest SSB transmission periodicity is determined as the default SSB transmission periodicity, the performance for high mobility necessary for a cell supporting high movement speed is guaranteed. However, in this case, since the ping-pong phenomenon may occur in the RSRP of a cell where an SSB is transmitted with long SSB transmission periodicity, stable handover to the corresponding cell cannot be performed.

Thus, when providing the SSB transmission periodicity per cell, the BS may directly configure the default SSB transmission periodicity by considering the stable environment that the system desires to secure.

Meanwhile, similar to the above-described embodiment where SSB transmission periodicity is directly configured, an embodiment for reducing power consumption caused by neighbor cell measurement can be additionally considered. That is, in the case of a synchronous network or a system where SSB transmission from all cells is guaranteed in specific duration, measurement duration and timing offsets may be informed together with SSB transmission periodicity.

In this case, if SSB transmission periodicity is given, a timing offset may indicate the location of measurement duration in terms of system time.

The SSB measurement time length that is determined according to the SSB transmission periodicity, measurement duration, and timing offset can be defined as an SSB measurement window, and a UE performs cell detection and RSRP measurement only in the SSB measurement window.

Meanwhile, each of the timing offset and measurement duration for determining the SSB measurement window may respectively have one value, and in this case, the same timing offset value and the same measurement duration can be applied to cells included in the cell list and cells not included in the cell list in order to determine the SSB measurement window for SSB measurement.

That is, since each cell has different SSB transmission periodicity, even if the same timing offset and measurement duration are applied, a different SSB measurement window can be calculated per cell, and the UE can perform the SSB measurement per cell according to each of the calculated SSB measurement windows.

In addition, information on the timing offset and measurement duration may be signaled together with the information on the SSB transmission periodicity for the cells included in the cell list, or it may be signaled together with the information on the SSB transmission periodicity for the cells not included in the cell list.

Figure 10:
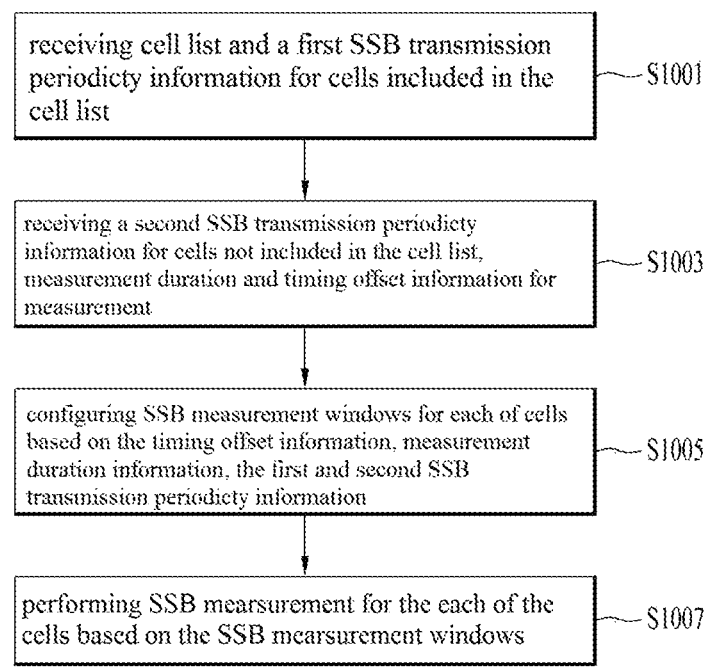
FIG. 10 is a diagram illustrating an embodiment where SSB transmission periodicity is set per cell according to the present invention.

Hereinafter, the above embodiments will be briefly described with reference to FIG. 10. To measure RSRP by using an SSB, a UE receives, from a BS, a cell list including major neighbor cells in the vicinity of a target cell and information on first SSB transmission periodicity for the neighbor cells in the cell list [S1001]. Thereafter, after or when receiving the cell list and the information on the first SSB transmission periodicity, the UE receives second SSB transmission periodicity (i.e., default SSB transmission periodicity) for cells that are not included in the cell list and measurement duration and timing offset information [S1003]. In this case, the measurement duration and timing offset information may be transferred together with the cell list and the information on the first SSB transmission periodicity.

Thereafter, the UE configures an SSB measurement window for measuring the RSRP of an SSB per cell based on the first SSB transmission periodicity, second SSB transmission periodicity, and measurement duration and timing offset [S1005], and then performs SSB measurement for each cell based on the SSB measurement window configured per cell [S1007]. Although the embodiment of FIG. 10 assumes that both SSB measurement windows for the cell included in the cell list and SSB measurement windows for the cells not included in the cell list are configured based on the same measurement duration and timing offsets, the measurement duration and timing offsets for the cells included in the cell list may be different from those for the cells that are not included in the cell list.

In addition, in the case of a system supporting multiple SSB transmission periodicity, it is possible to define SSB measurement windows for the entire system and then designate an SSB measurement window sub-set that is used to measure RSRP of each cell in the SSB measurement window set over the entire time period. In other words, a plurality of SSB measurement windows are determined by using multiple SSB transmission periodicity, and then the plurality of SSB measurement windows determined by using the multiple SSB transmission periodicity are defined as the SSB measurement window set. Thereafter, the plurality of SSB measurement windows included in the SSB measurement window set are grouped into one or more SSB measurement window sub-sets, and then each of the SSB measurement window sub-sets are designated for each cell. Then, the RSRP of each cell can be measured in the SSB measurement window sub-set configured for each cell.

For example, if ten SSB measurement windows are defined as one SSB measurement window set, the RSRP for the first cell may be measured in the SSB measurement window sub-set composed of first, fifth, and ninth SSB measurement windows, and the RSRP for the second cell may be measured in the SSB measurement window sub-set composed of second, sixth, and tenth SSB measurement windows. In this case, if the default SSB measurement window sub-set is designated together as described above, the RSRP for cells not included in the cell list can be measured by using the SSB measurement window sub-set.

Further, when a plurality of SSB measurement windows to be included in an SSB measurement window set are determined, the same measurement duration and offsets may be used as described above.

Meanwhile, the above-described embodiments can also be applied to RRM measurement where other reference signals are used rather than SSBs. For example, the above-described embodiments can be applied to RRM measurement where CSI-RSs are used.

<SSB Measurement Based on Set of SSBs for Measurement Among Available SSBs or Priority Thereof>

In the NR system, since one cell transmits signals by using multiple beams capable of obtaining high beam gain, it is possible to increase coverage in high frequency bands and obtain high throughput in the same bands.

In this environment where the system operates by using multiple beams, it is preferable to transmit an SSB in multiple beam directions by applying time division thereto for the purpose of coverage enlargement. Meanwhile, when a UE accesses a specific cell, the UE should measure the power level of a neighbor cell to support the mobility of the communication system. In the NR system, the SSB is used as the basic signal for measuring received power. Specifically, a UE detects the presence of a cell by using SSBs, if there is no separate indication, measures received power of SSBs at all available locations defined by the standards, that is, candidate SSB locations for the detected cell, and then defines the RSRP of the SSB with the highest received power as the RSRP of the corresponding cell.

For example, in a band of 6 GHz or higher, up to 64 SSBs can be transmitted. In addition, after detecting one cell, a UE operating in a band of 6 GHz or higher measures received power at the maximum of 64 candidate SSB locations regardless of the number of ATSSs of the corresponding cell, calculates the RSRP of the corresponding cell, and then reports it to a BS if necessary.

However, since the UE should measure the RSRP of a neighbor cell for mobility support, the UE may measure the received power of SSBs which are not actually transmitted. In other words, the UE may perform unnecessary operation, and this may increase not only the UE's power consumption but also the UE complexity because the UE should measure RSRP of many SSBs. To solve these problems, in the NR system, the BS need to additionally transmit information on the number and locations of ATSSs to the UE. That is, during the neighbor cell measurement procedure, the UE can receive information on which SSBs among available multiple SSBs (i.e., candidate SSBs) the neighbor cell uses as ATSSs and then measure the RSRP for the corresponding ATSSs, thereby reducing its power consumption.

To reduce the complexity and power consumption of a UE as described above, it is necessary to inform the UE of the indices of ATSSs among available SSBs. In the NR system, up to 64 SSBs can be transmitted in one cell, and which SSBs among up to 64 candidate SSBs are used as ATSSs can be differently configured per cell. Therefore, in order to transmit ATSS information for all the cells, a 64-bit bitmap should be used per cell, but this may significantly increase signaling overhead. Hence, the present invention describes a method for transmitting information on ATSS transmission at cells to reduce power consumption required for a UE to measure received power levels of neighbor cells and allow the UE to efficiently use resources.

Basically, in the case of a serving cell, other channels such as a paging message, a PDSCH, etc. cannot be transmitted on the resource elements (REs) used for transmitting an SSB, but the transmission of other channels may be allowed on the resources where SSB transmission is possible but no SSB is transmitted, that is, the resources where no ATSS is transmitted to improve the frequency efficiency.

In this case, the UE should be able to know information on resource mapping of data channels and whether SSBs are transmitted on the corresponding resources from control channels. Thus, the UE needs to accurately know information on the SSB transmission at the serving cell with respect to each SSB. Therefore, information on ATSSs which the serving cell freely configures and transmits should be accurately informed by using a bitmap with bits corresponding to the maximum number ($N_{max,SSB}$) of SSBs that can be transmitted in a corresponding frequency band. If the locations of the ATSSs are determined according to a predetermined rule rather than being freely configured by the serving cell, the number of ATSSs may be simply transmitted as the information for the ATSSs.

The information on ATSSs of neighboring cells included in the cell list may be informed in the same way as that used for the serving cell. However, since signaling overhead may significantly increase when $N_{max,SSB}$ is too large, it is preferred to compress the corresponding information.

In the NR system, since the maximum value of $N_{max,SSB}$ is defined as 8 in a frequency band of 6 GHz or lower and 64 in a frequency band of 6 GHz or higher, the case where $N_{max,SSB}$ is too large may indicate that an SSB is transmitted in a frequency band of 6 GHz or higher.

That is, for example, when $N_{max,SSB}$ is 64 and the SSB indices of ATSSs are {1,2,3,4,9,10} if information on each ATSS is transmitted by using a 64-bit full bitmap, signaling overhead significantly increases. To solve this problem, the following methods can be used.

(1) By grouping a total of 64 candidate SSBs such that a group is composed of 8 SSBs, a bitmap is compressed as 8 bits, and then it can be transmitted in the form of '11000000'. In this case, 8 bits are required. Upon receiving the bitmap information corresponding to '11000000', a UE can preferentially measure the RSRP for the SSBs with the indices of 1 to 16 or measure only the RSRP for the corresponding SSBs.

(2) Although 6 SSBs (with the SSB indices of {1,2,3,4, 9,10}) are actually transmitted in the above-described example, a method for informing "Max index=10" in order to preferentially measure the RSRP of the SSBs with the indices from 1 to 10 with reference to the highest index can be considered. At this time, 6 bits are required. In this case, a UE can preferentially measure the RSRP for the SSBs with the indices of 1 to 10 or measure only the RSRP for the corresponding SSBs.

(3) Together with such a compressed bit map described in method (1), the number of SSBs of which the RSRP needs to be preferentially measured by starting at the lowest index of each group is informed. For example, when '11000000' is transmitted by using an 8-bit bitmap, $N_{SSBperGroup}=4$ is transmitted together to indicate that 4 SSBs are actually transmitted in each group. At this time, the number of required bits is 8+3=11. In this case, a UE can preferentially measure the RSRP for the SSBs with the indices of 1 to 4 and 9 to 12 or measure only the RSRP for the corresponding SSBs.

In addition, a UE can utilize the above-described ATSS information as follows.

Embodiment 1-1

If a BS transmits ATSS information to a UE according to the above-described methods, upon receiving the ATSS information, the UE uses the ATSS information to obtain information on the indices of SSBs of which the RSRP should be preferentially measured per cell or information on the indices of SSBs which the UE should measure at least. If necessary, the UE can measure the RSRP of an SSB at the time locations of other candidate SSBs except the SSBs included in the ATSS information. If the UE obtains valid RSRP information at the time locations of other candidate SSBs, the UE can report the obtained information to the BS. In other words, the ATSS information of a neighbor cell for preferential RSRP measurement may not accurately match with actual ATSSs.

Embodiment 1-2

As another method, when a BS transmits ATSS information to a UE, upon receiving the ATSS information, the UE assumes that the BS transmits no SSB in other locations except the locations of the ATSSs in accordance with the ATSS information. Thus, the UE does not perform RSRP measurement at other locations except the locations in accordance with the ATSS information. By doing so, the UE can minimize its power consumption. Meanwhile, the above-described method could be interpreted to mean that instead of the location where SSB transmission is assumed, the indices of SSBs where no RSRP measurement is required are designated because there are no SSB transmission.

Meanwhile, even if ATSS information is transmitted per neighbor cell to a UE to reduce complexity and power consumption, the same problem that received power for SSBs which are not actually transmitted is measured may also occur if a detected cell is not included in the cell list. Thus, the default value related to SSB transmission applicable to cells not included in the cell list need to be informed. Since the default value is not transmitted per cell, it may information for each SSB like a full bitmap for the serving cell or be transmitted in the form of compressed ATSS information as described above.

In addition, if signaling overhead increases due to a number of cells even though compressed information is used or if most cells transmit SSBs with the same pattern, information per cell on the cell list is dropped. In this case, a UE may use the above-described default value in SSB selection where RSRP measurement priority is applied for all cells except the serving cell. Additionally, when the BS does not transmit the default value although it is defined, the UE may use the ATSS information of the serving cell as ATSS information for determining RSRP measurement priority of a neighbor cell. Meanwhile, the BS may directly instruct to use the ATSS information of the serving cell as the ATSS information of the neighbor cell by inserting additional 1-bit information. In this case, the default value may be used according to the methods defined in embodiment 1-1 or 1-2.

The above-described ATSS information is primarily transmitted via system information in order to allow a UE in IDLE mode to use it as ATSS information for RSRP measurement for a neighbor cell or RE mapping information of a paging message. Additionally, the ATSS information may be transmitted in an RRC message to use it as RE mapping information in the call configuration process or more accurate information for RSRP measurement. In this case, the ATSS information received through the RRC message may have higher priority than the ATSS information received via the system information. That is, if a UE receives ATSS information through an RRC message after receiving ATSS information via system information, the UE may perform RSRP measurement for an SSB or obtain RE mapping information by using the ATSS information received through the RRC message. If call release is completed, the UE may use the information received through the system information as ATSS information for serving and neighbor cells. In other words, when the call release is completed, the ATSS information received via the system information has higher priority than the ATSS information received through the RRC message.

<Definitions of RSRP when Beamforming is Performed and Additional Terminologies for RSRP>

In the system operating in high frequency bands such as mmWave, beamforming can be used by not only a transmitting end but also a receiving end. In addition, it is desirable that a receiving end uses the beamforming to receive data or control channels and measure the quality of received signals for supporting mobility. In the case of UEs operating in the environment where receiving ends use the beamforming, the UEs may have different antenna configurations or different analog beamforming characteristics according to their implementation. In this case, if the RSRP definition in the LTE system is applied, each UE may report a different RSRP value to a BS due to the different antenna configurations. Of course, although absolute RSRP values are different from each other due to the different antenna configurations, if antenna gain is interpreted as different path loss on a channel and such path loss values are equally applied to all the cells, it may not be a significant problem in making a handover decision.

However, according to Minimization of Drive Test (MDT) in TS 37.320, when a UE reports its location information and communication quality information such as RSRP to a BS, the BS can use the location information and communication quality information for its cell optimization and configuration. Meanwhile, in the LTE system, since most UEs has used omni-directional antennas, measurement errors or different antenna characteristics according to UE implementation cause variation in RSRP depending on locations. On the other hand, when individual UEs have different antenna configurations or analog beamforming characteristics, there occurs a problem that RSRP bias is formed together with the RSRP variation, and this may cause the network to make serious errors in performing cell optimization.

Therefore, the present invention propose a method by which each UE reflects a different antenna configuration in defining RSRP. In addition, each UE can perform RSRP measurement based on the different antenna configuration and report the measurement results to a BS, and the BS can reflect the RSRP value in beamforming.

In other words, the system defines a reference antenna configuration for UEs. The reference antenna configuration can be defined in the relevant standard or transmitted by a BS to a UE. For example, four linearly arranged antenna elements are included in one antenna port, and this can be informed the UE by the BS.

Thereafter, when a reference antenna is configured, the UE and the BS may perform the following methods in order to reflect gain due to the antenna configuration in RSRP values.

(1) The UE adjusts an RSRP value by considering the current reception antenna configuration to obtain an RSRP$_{REF}$ value when the reference antenna configuration is assumed. For example, if the current reception antenna configuration is 16 antenna elements per port and the reference antenna configuration is 4 antenna elements per port, the UE perform the adjustment as follows: RSRP$_{REF}$=RSRP−6 dB and then report the adjusted RSRP value. In this case, whether the current reception antenna configuration is reflected in RSRP for mobility support and RSRP for MDT can be independently determined. Further, it can be determined according to the RSRP definition in the standard or informed the UE by the BS through a measurement report configuration parameter.

(2) During the call configuration step or MDT configuration step, the UE estimates a difference between the RSRP value according to the reference antenna configuration and the RSRP value according to the current reception antenna configuration and reports the estimated difference to the BS. Thereafter, the UE measure the RSRP value according to the current antenna configuration and then reports it to the BS. The BS calculates the $RSRP_{REF}$ value by applying the reported RSRP value to the previously reported difference value.

For example, the current reception antenna configuration is 16 antenna elements per port and the reference antenna configuration is 4 antenna elements per port, the UE reports to the BS that $RSRP_{delta}$=6 dB, and the BS stores the value of 6 dB for the UE that reports the $RSRP_{delta}$ value. In this case, if necessary, the UE may report the $RSRP_{delta}$ value per frequency band, and the BS may calculate the final RSRP value by reflecting the $RSRP_{delta}$ value per frequency band in the inter-frequency measurement results.

(3) During the call configuration step or MDT configuration step, the UE reports the current reception antenna configuration including the number of antenna elements per antenna port to the BS. Thereafter, the UE measures the RSRP value according to the current reception antenna configuration and reports it to the BS, and the BS calculate the $RSRP_{REF}$ value by reflecting the reported UE's reception antenna configuration. In this case, the UE may report the reception antenna configuration per frequency band, and the BS may calculate the final RSRP value by reflecting the reception antenna configuration per frequency band in the inter-frequency measurement results in each frequency band.

<SSB and CSI-RS in Inter-Frequency Measurement Mode>

When RSRP is measured by using a CSI-RS in inter-frequency measurement mode, an SSB is used for performing cell detection and obtaining system timing information on a cell because self-synchronization cannot be achieved from the CSI-RS. Thereafter, the RSRP for the CSI-RS can be measured based on the obtained information. In addition, if the beam width of a CSI-RS is different from that of an SSB, cells may transmit resources where the CSI-RS is mapped in target frequency bands during the time period except an SS burst set corresponding to time duration in which all candidate SSBs, which are defined per frequency band, are transmitted in order to secure the freedom in resource management. The present invention describes a method for allocating a measurement gap for allowing a UE to perform inter-frequency measurement and resources therefor, which can be used in the above case.

While configuring a measurement gap for inter-frequency measurement, a BS simultaneously configures both a measurement gap for an SSB for cell detection and a measurement gap for a CSI-RS for CSI-RS RSRP measurement for a UE. In this case, during the SSB measurement gap, the UE can performs cell detection operation and obtain timing information for the detected cell. In addition, the UE use the CSI-RS measurement gap to measure the CSI-RS RSRP for the detected cell. Moreover, the SSB measurement gap and CSI-RS measurement gap may have the same or different periodicity, and their periodicity may overlap with each other.

However, since the SSB measurement gap and the CSI-RS measurement gap are simultaneously configured, interruption to the serving cell may frequently occur. Therefore, another method for configuring an SSB measurement gap and a CSI-RS measurement gap can be considered.

Specifically, an SSB measurement gap is configured for a UE. By using an SSB based on the measurement gap, the UE performs cell detection and then obtains timing information for the detected cell and the SSB RSRP for the detected cell. Thereafter, the UE reports some or all of the obtained value or information to the BS. If it is determined that information on CSI-RS RSRP for the detected cell is required, the BS configures a CSI-RS measurement gap for the UE. In this case, the UE measures the CSI-RS RSRP by using the cell information obtained through the SSB-based cell detection and the CSI-RS measurement gap and report the measured CSI-RS RSRP to the BS.

Hereinafter, regarding the aforementioned method, a method for allocating a special type of measurement gap and resources therefor will be further described. When CSI-RS resources are allocated, a BS may allocate a CSI-RS and an SSB, which is spatially QCLed, to the same symbol region in order to reduce the UE complexity caused when the BS transmits signals with different beam widths or signals to be transmitted in different direction on the same symbols and perform the inter-frequency measurement by using the CSI-RS.

Thus, when the resources for a CSI-RS which is spatially QCLed with a specific SSB are allocated, time resource information of the CSI-RS can carry only information on the symbol at which the CSI-RS in the specific SSB is located. In addition, when the method for allocating a special type of measurement gap is used, it is not necessary to separately configure an SSB measurement gap and a CSI-RS measurement gap. That is, a common measurement gap can be allocated.

Hereinafter, a further method for allocating a measurement gap will be described. When CSI-RS resources are allocated, information on time resources is generally based on absolute system time such as an SFN, a frame index, a slot index, an OFDM symbol index, etc. However, in the NR system, the system time can be obtained by decoding the PBCH of a target cell, but this may significantly increase the UE complexity.

To solve this problem, if time resource information of a CSI-RS is set as the relative location to that of an SSB in an inter-frequency measurement and CSI-RS resource configuration step, a UE can obtain the location of CSI-RS resources without decoding any PBCH. To this end, CSI-RS resource information can be transmitted to a UE as information indicating the relative difference between the time-domain location of an SSB in the SSB measurement gap, which is applied to a target cell or all cells in common, and the time-domain location of a CSI-RS in the CSI-RS measurement gap.

<Channel State Information-Reference Signal (CSI-RS) Based RRM Measurement>

1. CSI-RS Periodicity

In the NR system, a CSI-RS is used for various purposes. For example, it can be used to determine downlink MCS and resource allocation and manage downlink beams and L3 mobility. The CSI-RS properties for channel quality measurement is different from those for beam management/mobility. The CSI-RS configuration for L3 mobility can be reused as the CSI-RS configuration for beam management.

In other words, the CSI-RS configuration for mobility support may be equal to the CSI-RS configuration for beam management.

For the basic CSI-RS property for supporting L3 mobility, whether the CSI-RS is periodic or aperiodic should be determined. If the CSI-RS is triggered in an aperiodic manner, downlink control overhead may occur, and it is not easy to dynamically control CSI-RS transmission at a neighbor cell for L3 mobility. Thus, considering the UE operation for L3 mobility, the CSI-RS should be transmitted periodically.

Meanwhile, the transmission periodicity of an SSB can be selected from {5 ms, 10 ms, 20 ms, 40 ms, 80 ms, 160 ms}. The CSI-RS may be used as a complementary reference signal to support not only stable mobility when the SSB has long transmission periodicity and but also stable mobility in fine beam level. Therefore, the CSI-RS does not need to have long periodicity, and {5 ms, 10 ms, 20 ms} may be used as the CSI-RS periodicity for RRM measurement.

2. CSI-RS Bandwidth

In the LTE system, a CRS is used for RRM measurement, and the measurement bandwidth for the CRS is separately configured because the system bandwidth of a neighbor cell is different from that of a serving cell. However, configuring the measurement bandwidth for the CRS separately does not mean that a UE does not fully use the CRS, that is, the UE use the measurement bandwidth to the extent that the minimum performance requirement is satisfied in order to minimize its complexity.

Similarly, in the NR system, the transmission bandwidth of a CSI-RS to be applied for all neighbor cells can be configured through a UE-dedicated RRC configuration message. From the perspective of a UE, the information transmitted in the UE-dedicated RRC configuration message means the maximum allowed measurement bandwidth. It is considered as an implementation issue how much portion of the bandwidth of the CSI-RS is actually used by for measurement.

3. CSI-RS Numerology (1) Subcarrier Spacing

Basically, the subcarrier spacing of a CSI-RS is based on that of a data channel to facilitate resource allocation, but the subcarrier spacing of a data channel in a neighbor cell may not be equal to that in a serving cell. Therefore, the subcarrier spacing of the CSI-RS may be semi-statically configured per cell or per frequency through an RRC configuration message. It is preferable to configure the subcarrier spacing of the CSI-RS per frequency in terms of reduction of UE complexity.

(2) Sub-Time Unit Transmission

For CSI-RS transmission for beam management, the NR system supports sub-time units, each of which is equal to or smaller than an OFDM symbol in reference numerology. In addition, among some candidates for sub-time unit transmission for receiving beam sweeping or transmission beam sweeping in an OFDM symbol, larger subcarrier spacing has a problem of increasing implementation complexity in that the spectrum efficiency decreases due to guard subcarriers and it requires a different sampling rate, a different FFT size, and an additional receiving filter for different numerology. Therefore, IFDMA may be more suitable for the sub-time unit transmission.

4. QCL Information and Measurement Report Contents

In CONNECTED mode, a CSI-RS can be used for DL measurement in addition to an SSB. That is, there can be multiple SSBs for measuring multiple SB-RSRP, and multiple CSI-RSs can be configured for each of the multiple SSBs. Since a UE traces CSI-RS based RSRP in addition to SSB-RSRP during CONNECTED mode, the relationship between the SSB-RSRP and the CSI-RS based RSRP can be usefully used for the downlink measurement.

Meanwhile, a CSI-RS can be associated with an SSB. That is, a UE may detects an SSB first, obtain the time/frequency synchronization thereof, and then estimate the time/frequency synchronization of a CSI-RS from the obtained SSB per cell. If the bandwidth of the SSB is larger than that of the CSI-RS and several CSI-RSs can exist in the width of the SSB, part of spatial information can be obtained from the SSB. In other words, a CSI-RS set can be defined within the beam width of a specific SSB, and this CSI-RS set information should be provided to UEs. On the other hand, if the transmission periodicity of the SSB is much longer than that of the CSI-RS, this relationship between the CSI-RS and SSB may not be useful in obtaining the spatial information. Thus, in this case, the CSI-RS may not be associated with the specific SSB.

Hence, depending on whether a CSI-RS is associated with an SSB, the measurement report contents may differ. When a CSI-RS RSRP based measurement event is triggered, SSB-RSRP should be reported together with CSI-RS RSRP if the CSI-RS is associated with the SSB. On the contrary, if the CSI-RS is not associated with the SSB, the UE does not need to report SSB-RSRP when reporting CSI-RS RSRP. In addition, if CSI-RS resources are not configured for a specific cell, only SSB-RSRP may be reported for the corresponding cell.

5. CSI-RS Measurement for a Cell that is not Included in a Cell List

When a network configures UEs CSI-RS based measurement, the network can provide CSI-RS configurations per cell and neighbor cell lists. The number of neighbor cell lists or CSI-RSs can be limited to reduce signaling overhead. To prevent periodic broadcasting of the CSI-RS configurations, the CSI-RS configuration information should be provided via UE-dedicated RRC signaling. If a UE detects the SSB of a cell that is not in neighbor cell list or of which the CSI-RS configuration is not given, the UE may request the CSI-RS configuration for the corresponding cell.

Figure 11:
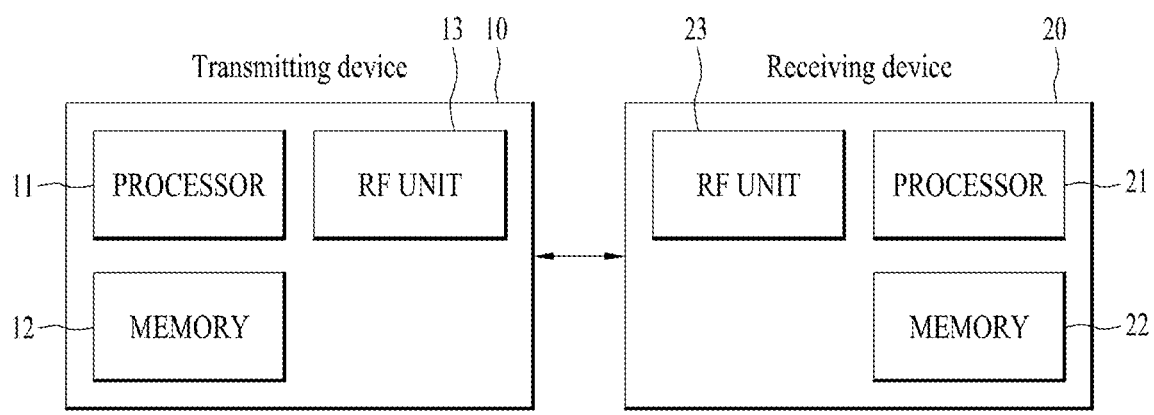
FIG. 11 is a block diagram illustrating components of a transmission apparatus 10 and a reception apparatus 20, for implementing the present disclosure.

FIG. 11 is a block diagram illustrating components of a transmitting device 10 and a receiving device 20 which implement the present disclosure.

The transmitting device 10 and the receiving device 20, respectively include radio frequency (RF) units 13 and 23 which transmit or receive radio signals carrying information/ and or data, signals, and messages, memories 12 and 22 which store various types of information related to communication in a wireless communication system, and processors 11 and 21 which are operatively coupled with components such as the RF units 13 and 23 and the memories 12 and 22, and control the memories 12 and 22 and/or the RF units 13 and 23 to perform at least one of the foregoing embodiments of the present disclosure.

The memories 12 and 22 may store programs for processing and control of the processors 11 and 21, and temporarily store input/output information. The memories 12 and 22 may be used as buffers.

The processors 11 and 21 generally provide overall control to the operations of various modules in the transmitting device or the receiving device. Particularly, the processors 11 and 21 may execute various control functions to implement the present disclosure. The processors 11 and 21 may be called controllers, microcontrollers, microprocessors, microcomputers, and so on. The processors 11 and 21 may be achieved by various means, for example, hardware, firmware, software, or a combination thereof. In a hardware configuration, the processors 11 and 21 may be provided with application specific integrated circuits (ASICs), digital signal processors (DSPs), digital signal processing devices (DSPDs), programmable logic devices (PLDs), field programmable gate arrays (FPGAs), etc. In a firmware or software configuration, firmware or software may be configured to include a module, a procedure, a function, or the like. The firmware or software configured to implement the present disclosure may be provided in the processors 11 and 21, or may be stored in the memories 12 and 22 and executed by the processors 11 and 21.

The processor 11 of the transmitting device 10 performs a predetermined coding and modulation on a signal and/or data which is scheduled by the processor 11 or a scheduler connected to the processor 11 and will be transmitted to the outside, and then transmits the encoded and modulated signal and/or data to the RF unit 13. For example, the processor 11 converts a transmission data stream to K layers after demultiplexing, channel encoding, scrambling, modulation, and so on. The encoded data stream is referred to as a codeword, equivalent to a data block provided by the MAC layer, that is, a transport block (TB). One TB is encoded to one codeword, and each codeword is transmitted in the form of one or more layers to the receiving device. For frequency upconversion, the RF unit 13 may include an oscillator. The RF unit 13 may include Nt transmission antennas (Nt is a positive integer equal to or greater than 1).

The signal process of the receiving device 20 is configured to be reverse to the signal process of the transmitting device 10. The RF unit 23 of the receiving device 20 receives a radio signal from the transmitting device 10 under the control of the processor 21. The RF unit 23 may include Nr reception antennas, and recovers a signal received through each of the reception antennas to a baseband signal by frequency downconversion. For the frequency downconversion, the RF unit 23 may include an oscillator. The processor 21 may recover the original data that the transmitting device 10 intends to transmit by decoding and demodulating radio signals received through the reception antennas.

Each of the RF units 13 and 23 may include one or more antennas. The antennas transmit signals processed by the RF units 13 and 23 to the outside, or receive radio signals from the outside and provide the received radio signals to the RF units 13 and 23 under the control of the processors 11 and 21 according to an embodiment of the present disclosure. An antenna may also be called an antenna port. Each antenna may correspond to one physical antenna or may be configured to be a combination of two or more physical antenna elements. A signal transmitted from each antenna may not be further decomposed by the receiving device 20. An RS transmitted in correspondence with a corresponding antenna defines an antenna viewed from the side of the receiving device 20, and enables the receiving device 20 to perform channel estimation for the antenna, irrespective of whether a channel is a single radio channel from one physical antenna or a composite channel from a plurality of physical antenna elements including the antenna. That is, the antenna is defined such that a channel carrying a symbol on the antenna may be derived from the channel carrying another symbol on the same antenna. In the case of an RF unit supporting MIMO in which data is transmitted and received through a plurality of antennas, the RF unit may be connected to two or more antennas.

In the present disclosure, the RF units 13 and 23 may support reception BF and transmission BF. For example, the RF units 13 and 23 may be configured to perform the exemplary functions described before with reference to FIGS. 5 to 8 in the present disclosure. In addition, the RF units 13 and 23 may be referred to as transceivers.

In embodiments of the disclosure, a UE operates as the transmitting device 10 on UL, and as the receiving device 20 on DL. In the embodiments of the disclosure, the gNB operates as the receiving device 20 on UL, and as the transmitting device 10 on DL. Hereinafter, a processor, an RF unit, and a memory in a UE are referred to as a UE processor, a UE RF unit, and a UE memory, respectively, and a processor, an RF unit, and a memory in a gNB are referred to as a gNB processor, a gNB RF unit, and a gNB memory, respectively.

The gNB processor according to the present invention transmits, to the UE, information on first SSB transmission periodicity for cells included in a cell list and information on second SSB transmission periodicity for cells not included in the cell list. Thereafter, the gNB processor transmits, to the UE, at least one SSB in predetermined candidate SSB regions.

In this case, the gNB processor may transmit information on an offset and measurement duration required for the UE to measure the SSB together. If necessary, the gNB processor may further transmit configuration information for a CSI-RS to the UE and transmit CSI-RSs either periodically or aperiodically according to the configuration information. In this case, the SSB may include a PSS/SSS/PBCH. A part of the region where the PBCH is mapped may be used for a DMRS. Meanwhile, the gNB processor may control the transceiver to receive RSRP, which is measured by the UE.

The UE processor according to the present invention controls to receive a cell list, information on first SSB transmission periodicity for cells included in the cell list, and information on second SSB transmission periodicity for cells not included in the cell list and receive information on an offset and measurement duration. In addition, the UE processor sets up an SSB measurement window for each cell by using the first and second SSB transmission periodicity and the information on the offset and the measurement duration.

In this case, the offset and the measurement duration is equally applied to set up the SSB measurement windows for all the cells. In other words, to set up a plurality of SSB measurement windows, information on the same offset and measurement duration is used, but since each cell or each cell group has different first and second transmission periodicity, each cell or each cell group may have a different SSB measurement window.

In addition, the UE processor does not measure the RSRP of the SSB during the time period except the SSB measurement window. In other words, the UE processor measures the RSRP of the SSB only in the SSB measurement window.

Moreover, the UE processor measures the RSRP of the SSB by using the SSS and PBCH-DMRS among the PSS/SSS/PBCH included in the SSB. When receiving CSI-RS configuration information from the gNB, the UE processor can further use the CSI-RS to measure the RSRP of the SSB. Additionally, the UE processor may control to report the RSRP of the SSB measured per cell to the gNB.

The gNB processor or the UE processor of the present disclosure may be configured to implement the present disclosure in a cell operating in a high frequency band at or above 6 GHz in which analog BF or hybrid BF is used.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method for measuring a Synchronization Signal Block (SSB) and device therefor are described based on the 5G New RAT system, the method and device can be applied to various wireless communication systems as well as the 5G New RAT system.

What is claimed is:

1. A method for measuring a Synchronization Signal Block (SSB) by a User Equipment (UE) in a wireless communication system, the method comprising:
    receiving (i) a cell list including information regarding at least one first cell, (ii) first SSB transmission periodicity information regarding a first periodicity of SSB transmissions for the at least one first cell that is included in the cell list, and (iii) second SSB transmission periodicity information regarding a second periodicity of SSB transmissions for a second cell that is not included in the cell list;
    measuring Reference Signal Received Power (RSRP) for an SSB of the at least one first cell based on a first SSB measurement window; and
    measuring RSRP for an SSB of the second cell based on a second SSB measurement window,
    wherein the first SSB measurement window is set up by using the first SSB transmission periodicity information and the second SSB measurement window is set up by using the second SSB transmission periodicity information, and
    wherein the first periodicity of SSB transmissions for the at least one first cell included in the cell list and the second periodicity of SSB transmissions for the at least one second cell not included in the cell list are configured such that the first periodicity cannot be longer than the second periodicity.

2. The method of claim 1, wherein the first and second SSB measurement windows are set up by further using information regarding an offset and measurement duration,
    wherein the information regarding the offset and the measurement duration is received together with at least one of the first or second SSB transmission periodicity information.

3. The method of claim 2, wherein the first and second SSB measurement windows are set up by using the same offset and the same measurement duration.

4. The method of claim 1, wherein each SSB of the first and second cells includes a Primary Synchronization Signal (PSS), a Secondary Synchronization Signal (SSS), and a Physical Broadcasting Channel (PBCH), and
    wherein the RSRPs for the SSBs of the first and second cells are measured by using Resource Elements (REs) on which the SSS is transmitted and a Demodulation Reference Signal (DMRS) received in a region where the PBCH is received.

5. The method of claim 4, wherein based on the UE receiving information regarding a Channel State Information Reference Signal (CSI-RS) for RSRP measurement, the RSRPs for the SSBs of the first and second cells are measured by further using the CSI-RS.

6. The method of claim 1, wherein no RSRP is measured in other time periods except the first and second measurement windows.

7. A User Equipment (UE) configured to measure a Synchronization Signal Block (SSB) in a wireless communication system, the UE comprising:
    a transceiver;
    at least one processor; and
    at least one computer memory operably connected to the at least one processor and storing instructions that, based on being executed by the at least one processor, perform operations comprising:
    receiving, through the transceiver, (i) a cell list including information regarding at least one first cell, (ii) first SSB transmission periodicity information regarding a first periodicity of SSB transmissions for the at least one first cell that is included in the cell list, and (iii) second SSB transmission periodicity information regarding a second periodicity of SSB transmissions for a second cell that is not included in the cell list;
    measuring Reference Signal Received Power (RSRP) for an SSB of the at least one first cell based on a first SSB measurement window; and
    measuring RSRP for an SSB transmitted from the second cell based on a second SSB measurement window,
    wherein the first SSB measurement window is set up by using the first SSB transmission periodicity information and the second SSB measurement window is set up by using the second SSB transmission periodicity information, and
    wherein the first periodicity of SSB transmissions for the at least one first cell included in the cell list and the second periodicity of SSB transmissions for the at least one second cell not included in the cell list are configured such that the first periodicity cannot be longer than the second periodicity.

8. The UE of claim 7, wherein the first and second SSB measurement windows are set up by further using information regarding an offset and measurement duration,
    wherein the information regarding the offset and the measurement duration is received together with at least one of the first or second SSB transmission periodicity information.

9. The UE of claim 8, wherein the first and second SSB measurement windows are set up by using the same offset and the same measurement duration.

10. The UE of claim 7, wherein each SSB of the first and second cells includes a Primary Synchronization Signal (PSS), a Secondary Synchronization Signal (SSS), and a Physical Broadcasting Channel (PBCH), and
    wherein the RSRPs for the SSBs of the first and second cells are measured by using Resource Elements (REs) on which the SSS is transmitted and a Demodulation Reference Signal (DMRS) received in a region where the PBCH is received.

11. The UE of claim 10, wherein based on the UE receiving information regarding a Channel State Information-Reference Signal (CSI-RS) for RSRP measurement, the RSRPs for the SSBs of the first and second cells are measured by further using the CSI-RS.

12. The UE of claim 7, wherein no RSRP is measured in other time periods except the first and second measurement windows.

* * * * *